United States Patent
Wakazono

(10) Patent No.: US 10,928,279 B2
(45) Date of Patent: Feb. 23, 2021

(54) ROTATION DRUM ALIGNMENT ASCERTAINING DEVICE

(71) Applicant: Kobe Steel, Ltd., Hyogo (JP)

(72) Inventor: Takehiko Wakazono, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 42 days.

(21) Appl. No.: 14/529,216

(22) Filed: Oct. 31, 2014

(65) Prior Publication Data

US 2015/0198506 A1 Jul. 16, 2015

(30) Foreign Application Priority Data

Jan. 16, 2014 (JP) .............................. JP2014-005882

(51) Int. Cl.
*G01M 17/02* (2006.01)
*G01M 1/04* (2006.01)
*G01M 1/16* (2006.01)

(52) U.S. Cl.
CPC .......... *G01M 17/022* (2013.01); *G01M 1/045* (2013.01); *G01M 1/16* (2013.01); *G01M 17/02* (2013.01)

(58) Field of Classification Search
CPC .... G01M 17/02; G01M 17/022; G01M 1/045; G01M 1/16; G01B 7/30; F16C 29/005
USPC ........................................................ 33/555.1
See application file for complete search history.

(56) References Cited

U.S. PATENT DOCUMENTS

| 4,787,150 | A | | 11/1988 | Klinginsmith, III |
| 5,155,919 | A | * | 10/1992 | Thomas ................. G01B 5/252 |
| | | | | 33/543 |
| 6,149,308 | A | * | 11/2000 | Schroeder ............ F16C 29/005 |
| | | | | 384/50 |
| 6,175,813 | B1 | * | 1/2001 | Purchase ................. G01B 7/12 |
| | | | | 33/555.1 |

(Continued)

FOREIGN PATENT DOCUMENTS

| CN | 102967247 A | 3/2013 |
| JP | S63-055434 A | 3/1988 |

(Continued)

OTHER PUBLICATIONS

"Specialized Technology Guide of Transport Aircraft ," Aviation Industry Corporation of China, pp. 111-118, Aviation Industry Publishing Company, published on Mar. 1997.

*Primary Examiner* — David M. Gray
*Assistant Examiner* — Quang X Nguyen
(74) *Attorney, Agent, or Firm* — Studebaker & Brackett PC

(57) ABSTRACT

In order to ascertain the placement of a rotation drum relative to the shaft axis of a spindle assembly, an alignment ascertaining device according to the present invention comprises a body portion made mountable on a mounting surface formed horizontally on the spindle assembly, the body portion having a guide face in the direction at right angles to the mounting surface; a linear guide portion mounted in an upward and down ward direction on a guide face; a slider mounted via a rolling member to the linear guide portion, the slider made movable in a direction in which the linear guide portion is installed; an arm member whose proximal end portion is attached to the slider and whose distal end portion extends toward the rotation drum;

(Continued)

and a dial gauge mounted on the distal end portion of the arm member.

8 Claims, 8 Drawing Sheets

(56) References Cited

U.S. PATENT DOCUMENTS

| | | | |
|---|---|---|---|
| 2009/0308156 A1 | 12/2009 | Sumimoto et al. | |
| 2011/0200276 A1* | 8/2011 | Bolzonaro | F16C 29/004 384/13 |
| 2013/0219733 A1* | 8/2013 | Smith | F01D 25/285 33/645 |
| 2013/0233067 A1* | 9/2013 | Wollbrinck | G01M 17/021 73/146 |
| 2013/0326891 A1* | 12/2013 | Alexander | G01B 5/25 33/228 |

FOREIGN PATENT DOCUMENTS

| | | |
|---|---|---|
| JP | H06-294709 A | 10/1994 |
| JP | 2009-300171 A | 12/2009 |

* cited by examiner

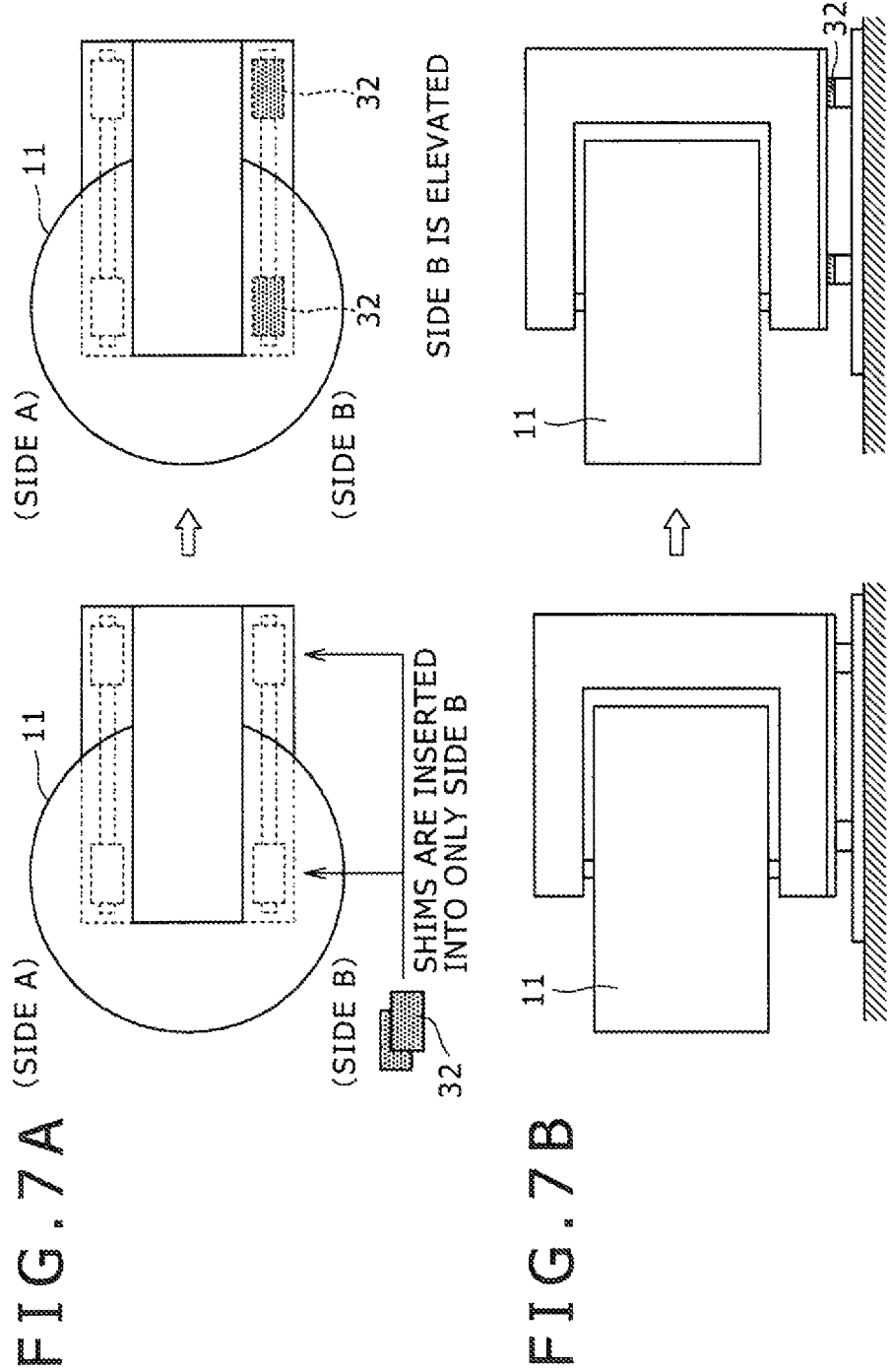

ROTATION DRUM ALIGNMENT ASCERTAINING DEVICE

BACKGROUND OF THE INVENTION

Field of the Invention

The present invention relates to a rotation drum alignment ascertaining device that ascertains a rotation drum to be parallel and/or at right angles relative to the shaft axis of a spindle assembly in a tire testing machine.

Description of the Related Art

A device such as disclosed in Patent Literature JP 2009-300171 A is known as a conventional tire testing machine that measures uniformity of a tire, or the like. This tire testing machine includes a spindle shaft that makes a tire rotatable about a shaft axis oriented in the perpendicular direction; a spindle housing that rotatably supports the spindle shaft; and a rotation drum rotatable about a shaft axis parallel with the shaft axis of the spindle shaft and movable close to or away from the tire. The machine is configured or designed to be able to conduct a tire test by causing the rotatably held rotation drum to make contact with the tire that rotates with it mounted on the spindle shaft.

The machine is configured such that the axis of the above described rotation drum is disposed so as to be parallel with the shaft axis of a spindle shaft and thus, a simulated road surface formed on an outer circumferential surface of the rotation drum and a tire are caused to make contact with each other in the direction of the normal.

As described above, the tire test machine disclosed in JP 2009-300171 A is configured such that the axis of the above described rotation drum is parallel with the shaft axis of a spindle shaft, and a simulated road surface formed on an outer circumferential surface of the rotation drum able to be caused to make contact with a tire in the direction of the normal. Immediately after the assembling of tire testing machines, however, the alignment has not been made in term of the axis of the rotation drum and the shaft axis of the spindle assembly. At that time, the axis of the rotation drum is in some cases out of parallelism with the shaft axis of the spindle assembly. In such a case, the characteristic, such as uniformity is not able to be measured precisely. For this reason, alignment of the rotation drum is needed such that the axis of the rotation drum is maintained to be parallel relative to the shaft axis of the spindle shaft (the axis of the rotation drum is aligned to be precisely parallel relative to the spindle assembly, and the upper surface and lower surface of the rotation drum are aligned to be at right angles relative to the spindle assembly).

Thus, in a conventional alignment device, a rod-shaped guide member is first disposed along a shaft axis of a spindle assembly and then, an arm member on which distal end portion a dial gauge is mounted is movably disposed in an upward and downward direction along a guide member. And when the alignment is made, the arm member itself is moved in a horizontal direction and a perpendicular direction to thereby measure using a dial gauge a value between two surface points on a side face and an upper surface (lower surface) of the rotation drum, and the parallelism and squareness of the rotation drum is ascertained.

However, in order to make the arm member movable on the guide member, some clearance is needed between the arm member and the guide member. As a matter of course, since the arm member is not securely fixedly attached to the guide member, the arm itself creates a jolt to some extent and thus, the accuracy ascertained of the parallelism and squareness of the rotation drum is not mentioned at all to be favorable.

The present invention is devised in light of the foregoing problems, and an object of the invention is to provide a rotation drum alignment ascertaining device able to precisely ascertain parallelism and/or squareness of a rotation drum relative to the shaft axis of a spindle assembly.

SUMMARY OF THE INVENTION

In the rotation drum alignment ascertaining device according to the present invention, the following technical measures are taken in order to overcome the above problems.

In a tire testing machine that includes a spindle assembly rotatably supporting a tire about a shaft axis oriented in the perpendicular direction, and a rotation drum rotatably supported about an axis parallel with the shaft axis of the spindle assembly and made movable close to or away from the tire, a rotation drum alignment ascertaining device according to the present invention that ascertains placement of the rotation drum relative to the shaft axis of the spindle assembly, comprises a body portion mountable on a mounting surface formed horizontally on the spindle shaft, the body portion having a guide face in a direction at right angles to the mounting surface; a linear guide portion mounted in an upward and downward direction on the guide face of the body portion; a slider mounted via a rolling member on the linear guide portion, the slider made movable by rolling the rolling member in a direction in which the linear guide portion is installed; an arm member whose proximal end portion is attached to the slider, and whose distal end portion extends toward the rotation drum; and a distance measuring device mounted on a distal end portion of the arm member, the device measuring a distance between the distal end of the arm member and the rotation drum.

A dial gauge is able to be used as the distance measuring device.

Preferably, the arm member includes a parallelism ascertaining arm member ascertains that, by measuring using the distance measuring device a distance between a side face of the rotation drum and a tip of the arm member, the side face thereof is parallel relative to the shaft axis of the spindle assembly; and a squareness ascertaining arm member that ascertains that, by measuring using the distance measuring device a distance between a top surface or a bottom surface of the rotation drum and the tip of the arm member, the top surface or the bottom surface of the rotation drum is at right angles relative to the shaft axis of the spindle assembly. And the parallelism ascertaining arm member and the squareness ascertaining arm member are also preferably made interchangeable with respect to the slider.

In situations where the dial gauge is employed, preferably, the arm member includes a parallelism ascertaining arm member that ascertains, by causing a probe of the dial gauge to make contact with the side face of the rotation drum, that the side face thereof is parallel with the shaft axis of the spindle assembly; a squareness ascertaining arm member that ascertains, by causing a probe of the dial gauge to make contact with the top surface or the bottom surface of the rotation drum, that the top surface or the bottom surface of the rotation drum is at right angles relative to the shaft axis of the spindle assembly. And the parallelism ascertaining arm member and the squareness ascertaining arm member are also preferably made interchangeable with respect to the slider.

Preferably, the side face of the rotation drum is formed with a thermally sprayed surface of the drum, formed at a location where the tire makes contact with the drum; an upper unsprayed surface formed adjacent to the upper portion of the thermally sprayed surface of the tire; and a lower unsprayed surface formed adjacent to the lower portion of the thermally sprayed surface of the tire; an upper level positioning device determines the position of the slider with respect to the linear guide portion so that a probe of the dial gauge disposed at a distal end portion of the parallelism ascertaining arm member makes contact with the upper unsprayed surface. Preferably, the device includes a lower level positioning device that determines the position of the slider with respect to the linear guide portion so that the probe of the dial gauge disposed at the distal end portion of the parallelism ascertaining arm member makes contact with the lower unsprayed surface.

According to the rotation drum alignment ascertaining device of the present invention, the placement of a rotation drum is able to be ascertained precisely relative to the shaft axis of a spindle assembly.

BRIEF DESCRIPTION OF THE DRAWINGS

FIG. 7A is a view showing a procedure of making the rotation drum parallel to a shaft axis of a spindle assembly, as viewed from above;

FIG. 7B is a view showing the procedure of making the rotation drum parallel thereto, as viewed from a side of the drum;

DESCRIPTION OF THE PREFERRED EMBODIMENTS

First Embodiment

An embodiment of an alignment ascertaining device 1 according to the present invention will be described in detail below with reference to the drawings. Prior to description of the alignment ascertaining device 1, a tire testing machine 2 will be described to which the alignment ascertaining device is provided.

Figure 1:
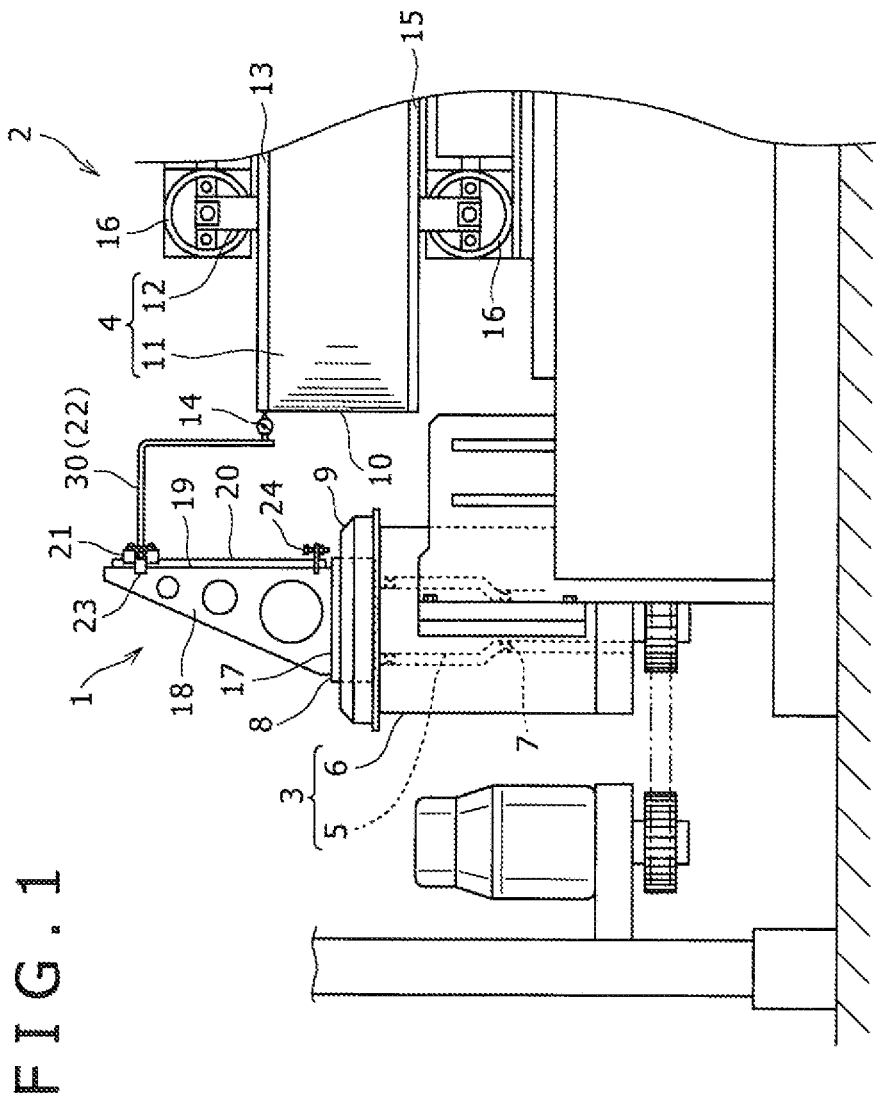
FIG. 1 is a view showing a tire testing machine to which is provided an alignment ascertaining device according to a first embodiment.

FIG. 1 schematically illustrates the tire testing machine 2 to which is provided the alignment ascertaining device 1 according to the first embodiment.

As shown in FIG. 1, the tire testing machine 2 includes a spindle assembly 3 rotatable about a shaft axis oriented in the perpendicular direction; and a rotation drum 4 supported rotatably about the axis parallel with the shaft axis of the spindle assembly 3, as well as movable close to or away from a tire.

More specifically, the spindle assembly 3 includes a spindle shaft 5 disposed along the shaft axis oriented in the perpendicular direction; and a spindle housing 6 being formed into a cylinder coaxially disposed with the spindle shaft 5 and having the spindle shaft 5 housed therewithin. Between the spindle shaft 5 and the spindle housing 6, there is provided a bearing 7 rotatably supporting the spindle shaft 5 relative to the spindle housing 6. The operation of the bearing 7 makes the spindle shaft 5 rotatable about the shaft axis oriented in the perpendicular direction.

The above spindle shaft 5 is a long, round rod-shaped member, and disposed in an upward and downward direction. The top end portion of the spindle shaft 5 is made to be a flange portion 8 of larger diameter in comparison with that of the lower portion the spindle shaft 5. The top surface of the flange portion 8 of the spindle shaft 5 is caused to be a flat surface disposed horizontally. In the center of the upper flat surface of the flange portion 8 of the spindle shaft 5, there is formed an engaging opening, not illustrated, into which the top end (bottom end) of an upper shaft is able to be fitted. And by coupling the upper shaft, through the engagement opening, with the flange portion 8 of the spindle shaft 5, the tire is configured or designed to be able to be sandwiched between an upper and a lower rim member 9, and to be mountingly held (fixedly mounted) by the spindle assembly 3.

Further, rotation drive force is transmitted from a motor disposed laterally adjacent to the spindle assembly 3 via a device such a belt or chain to the lower end portion of the spindle shaft 5, so that the spindle shaft 5, with the tire mountingly held relative to the spindle housing 6 (base), is configured or designed to be able to be rotatably driven.

The rotation drum 4 is a member cylindrically formed about the axis oriented in the perpendicular direction, i.e., the axis parallel with the shaft axis of the spindle assembly 3, and is horizontally spaced apart from the spindle assembly 3. The outer circumferential surface (side face) of the rotation drum 4 is formed into a cylindrical plane that rotates about the axis, and the cylindrical circumferential surface is made to be a simulated road surface 10 on which the tire is caused to travel.

More specifically, the rotation drum 4 includes a drum body 11 that is cylindrically shaped and whose outer circumferential surface is formed with the simulated road surface 10, and a drum shaft 12 that rotatably supports the drum body 11. In terms of the outer circumferential surface of the drum body 11, its middle portion in an upward and downward direction is roughened by thermal spraying. The drum body 11 is configured such that the tire travels on the roughened surface portion.

In addition, the outer circumferential surface adjacent to the upper portion of the thermally sprayed portion is made to be an upper unsprayed surface 13, so that a dial gauge 14 that will be described later is configured or designed to be able to make contact with the surface 13. Moreover, the outer circumferential surface adjacent to the lower portion of the thermally sprayed portion is made to be a lower unsprayed surface 15, so that, as is the case with the upper unsprayed surface 13, the dial gauge 14 is configured or designed to be able to make contact with the lower unsprayed surface 15. And in the alignment ascertaining device 1 according to the present embodiment, the dial gauge 14 is caused to make contact with two points, these upper and lower unsprayed surfaces 13, 15 and then to make the measurements, thereby making it possible to ascertain that the outer circumferential surface of the rotation drum 4 is parallel relative to the axis of the spindle assembly 3.

In the center of the rotation drum 4, there is formed in an upward and downward direction a through-hole, into which the drum shaft 12 is inserted. The drum shaft 12, which has a bearing, not shown, between itself and the drum body 11, supports rotatably the drum body 11 about the axis oriented in the perpendicular direction.

Additionally, the distance of the drum shaft 12 in an upward and downward direction is longer than that of the drum body 11; the top end of the drum shaft 12 protrudes above the upper surface of the drum body 11; and the bottom end of the drum shaft 12 protrudes below the lower surface of the drum body 11. And, provided at these protruding top and bottom ends are load cells 16 that are able to measure a load applied to the rotation drum 4, so that force component such as a load applied to drum shaft 12 (rotation drum 4) are able to be measured using these load cells 16.

Incidentally, the alignment ascertaining device 1 according to the present embodiment is the one that ascertains whether the axis of the rotation drum 4 is disposed parallel with shaft axis of the spindle assembly 3 and that ascertains the placement of the rotation drum 4 relative to the shaft axis of the spindle assembly 3.

More specifically, the alignment ascertaining device 1 for the rotation drum 4 according to the present embodiment has a body portion 18 that is made mountable on a mounting surface 17 (the top surface of the flange portion 8, for the present embodiment) formed, above the spindle assembly 3, with the mounting surface disposed horizontally. The body portion 18 is formed with a guide face 19 in the direction at right angles to the mounting surface 17, and the guide face 19 has a linear guide portion 20 mounted thereon in an upward and downward direction. In addition, there is provided to the linear guide portion 20a slider 21 (slide nut) that is mounted via a rolling member on the linear guide portion 20, and that is made movable by rolling the rolling member, in a direction in which the linear guide portion is installed. And there is provided to the slider 21 an arm member 22 whose proximal end portion is mounted on the slider 21 and whose distal end portion extends toward the rotation drum 4; and the dial gauge 14, mounted on the distal end portion of the arm member 22, that measures a distance from the distal end portion thereof to the surface of the rotation drum 4.

The body portion 18, linear guide portion 20, slider 21, arm member 22 and dial gauge 14 each constituting the alignment ascertaining device 1 according to the present embodiment will next be described in detail.

The body portion 18 is a member that is used for mounting the linear guide portion 20 in the direction perpendicular to the upper portion of the spindle assembly 3. More specifically, as described above, the flange portion 8 is formed on the top end of the spindle shaft 5 of the spindle assembly 3, and the top surface of the flange portion 8 is formed into a flat plane that is disposed horizontally. And, the body portion 18 is mounted on the mounting surface 17 in an upright position by having the upper surface of the flat flange portion 8 as the mounting surface 17.

Additionally, the body portion 18 is a member formed into an upwardly tapered one (rectangular prism having only one of its side planes diagonally removed). There is formed on the bottom of the body portion 18 a bottom face able to make planar contact with the above described mounting surface 17 (numeral A in FIG. 2). And the side face of the body portion 18 (numeral B in FIG. 2), orienting toward the rotation drum 4 is formed so as to be strictly at right angles relative to the bottom face, and is made to be the mounting surface 17 on which the above described linear guide portion 20 is mounted. In other words, when the body portion 18 is mounted on the top surface of the flange portion 8 so that the bottom face may make planar contact with the top surface of the flange portion 8, the side face of the body portion 18 is able to be provided perpendicularly, thereby allowing the linear guide portion 20 to be disposed in the perpendicular direction.

The linear guide portion 20 is a rail member mounted on the mounting surface 17 with the member extended in the perpendicular direction. It is used for guiding in an upward and downward direction the slider 21 that has the rolling member such as a ball and roller. A guide face that causes the rolling member to roll thereon is provided to the linear guide portion 20 so that the guide face may be parallel with the shaft axis of the spindle assembly 3, and therefore the slider 21 is made guidable in a direction (perpendicular direction) in which the guide face is disposed. In the case of the linear guide portion 20 in FIG. 2, the guide face is formed in the direction orthogonal to the mounting surface 17 that is disposed horizontally, and the slider 21 is made guidable along the guide face in the perpendicular direction.

Additionally, the linear guide portion 20 includes an upper level positioning device 23 (upper stopper) that determines an upper limit to a moving range of the slider 21, and a lower level positioning device 24 (lower stopper) that determines a lower limit to the moving range of the slider 21. The upper level positioning device 23 determines the position of the slider 21 with respect to the linear guide portion 20 so that a probe of the dial gauge 14, as will be described later, may be caused to make contact with the upper unsprayed surface 13 that is formed in the upper portion of the rotation drum 4 side face. In addition, the lower level positioning device 24 determines the position of the slider 21 with respect to the linear guide portion 20 so that the probe of the dial gauge 14, as will be described later, may be caused to make contact with the lower unsprayed surface 15.

There is provided to the above described upper and lower level positioning devices 23, 24 a positioning bolt 25 provided so as to protrude from the body portion 18 toward the slider 21. The positioning bolt 25, which is provided to a bolt mounting plate 26 that rises from the body portion 18 surface (guide face) located toward the rotation drum 4, makes contact with the slider 21 thereby allowing for restriction of the upward and downward movement of the slider 21.

More specifically, the bolt mounting plate 26 is provided so as to protrude from the guide face located on the side of the linear guide portion 20, toward the rotation drum 4. And the positioning bolt 25 is provided with it oriented in the horizontal direction so as to pass thickness-wise through the bolt mounting plate 26. In other words, the positioning bolt 25 is threadedly mounted to the bolt mounting plate 26 and therefore, if the positioning bolt 25 is fastened or unscrewed using a tool or the like, then the tip of the positioning bolt 25 moves forwardly from the bolt mounting plate 26 toward the slider 21, or moves backwardly away from the slider 21. And if the positioning bolt 25 is caused to move forwardly until the bolt tip makes contact with the side face of the slider 21, then the upward and downward movement of the slider 21 is restricted, and if the tip of the positioning bolt 25 is caused to be spaced apart from the side face of the slider 21, then the upward and downward movement thereof is permitted, thus enabling measurement to be made by causing the probe to make contact with the upper unsprayed surface 13 of the side face of the rotation drum 4.

On the other hand, a positioning bolt 27 for the lower level positioning device 24 is provided so as to pass through a bolt mounting plate 28 in an upward and downward direction, the bolt mounting plate 28 being provided so as to protrude toward the rotation drum 4 from a position adjacent to the lower side of the linear guide portion 20 in the body portion 18. The lower positioning bolt 27 is also configured or designed to be able to be adjusted height-wise using a tool or the like. Hence, should the above described lower level positioning device 24 be disposed at a place where the probe of the dial gauge 14 and the lower unsprayed surface 15 of the side face of the rotation drum 4 are at the same level, the measurement is able to be made by causing the probe to make contact with the unsprayed surface 15 thereof.

Figure 2:
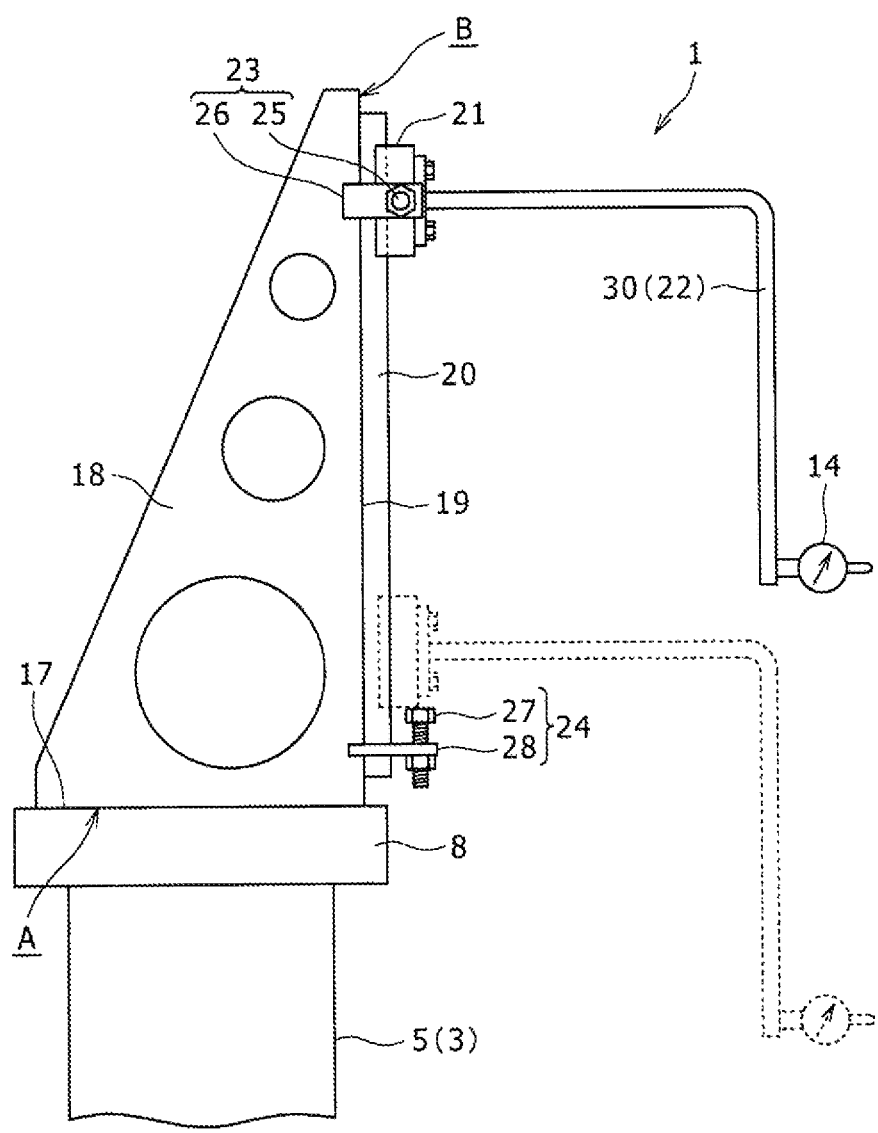
FIG. 2 is a front view of the alignment ascertaining device according to the first embodiment.
Figure 3:
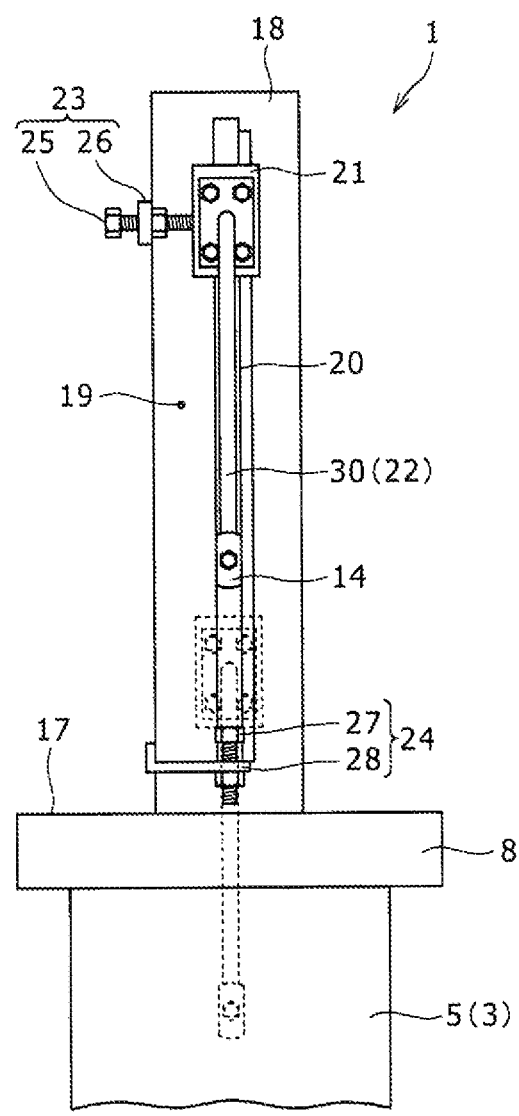
FIG. 3 is a side view of the alignment ascertaining device according to the first embodiment.

As shown in FIGS. 2 and 3, the slider 21 is a member that is made movable in a direction in which the above described linear guide portion 20 is installed (in an upward and downward direction). The slider 21 is formed in the recessed shape whose recessed surface faces the linear guide portion 20, as shown in FIG. 4B to be described later. By fitting the above described linear guide portion 20 into the recessed portion, the slider is made guidable in an upward and downward direction.

Further, the slider 21 has a rolling member such as a ball or roller that rolls on the guide face of the linear guide portion 20. The reason that such a rolling member is employed is described below.

Stated differently, when there is present no rolling member between the slider 21 and the linear guide portion 20, some clearance is needed therebetween in order to cause the slider 21 to move with respect to the linear guide portion 20. The presence of such clearance, however, causes the slider 21 to easily sway against the linear guide portion 20, making it difficult for the dial gauge 14 to be stabilized in attitude relative to the rotation drum 4, thereby reducing the measurement accuracy of the dial gauge 14. However, the above described slider 21 moves by the use of rolling resulting from the rolling member being rolled on the guide face and thus, a wobble is hardly generated in the move relative to the linear guide portion 20, thereby allowing good measurement accuracy of the dial gauge 14 to be retained.

Note that using the slider 21 utilizing a rolling member allows for reduction in clearance between itself and the linear guide portion 20, and in order to reduce the clearance further, preferably the slider 21 to which a preload has been applied is employed. In other words, pressing the slider 21 itself toward the linear guide portion 20 with a spring further reduces the clearance between the slider 21 and linear guide portion 20, allowing the dial gauge 14 to move upwardly and downwardly more precisely, thus allowing good accuracy of measurement with the dial gauge 14 to be retained.

The arm member 22 is a long, rod-shaped member that couples the slider 21 and the dial gauge 14 together. The proximal end portion of the arm member 22 is fixedly attached to the slider 21 using a bolt or the like. And the dial gauge 14 is disposed at the distal end portion of the arm member 22.

The above described arm member 22 includes a parallelism ascertaining arm member 30 and a squareness ascertaining arm member 31; the parallelism ascertaining arm member 30 is used to ascertain that the rotation drum 4 is parallel with the shaft axis of the spindle assembly 3; and the squareness ascertaining arm member 31 is used to ascertain that the rotation drum 4 is at right angles relative to the shaft axis of the spindle assembly 3.

As shown in FIGS. 1 and 2, the parallelism ascertaining arm member 30 is a rod-shaped member whose middle portion in the longitudinal direction is bent at substantially right angles. The dial gauge 14 is disposed on the distal end portion of the parallelism ascertaining arm member 30 so that the horizontally extending probe is caused to make contact with the side face of the rotation drum 4. Note that the parallelism ascertaining arm member 30 as exemplified in the drawing extends in the horizontal direction from its proximal end portion toward the rotation drum 4, and its middle portion in the longitudinal direction is downwardly bent at substantially right angles. And the probe of the dial gauge 14, facing toward the side face of the rotation drum 4, is mounted on the distal end (lower end) of the parallelism ascertaining arm member 30.

Figure 5:
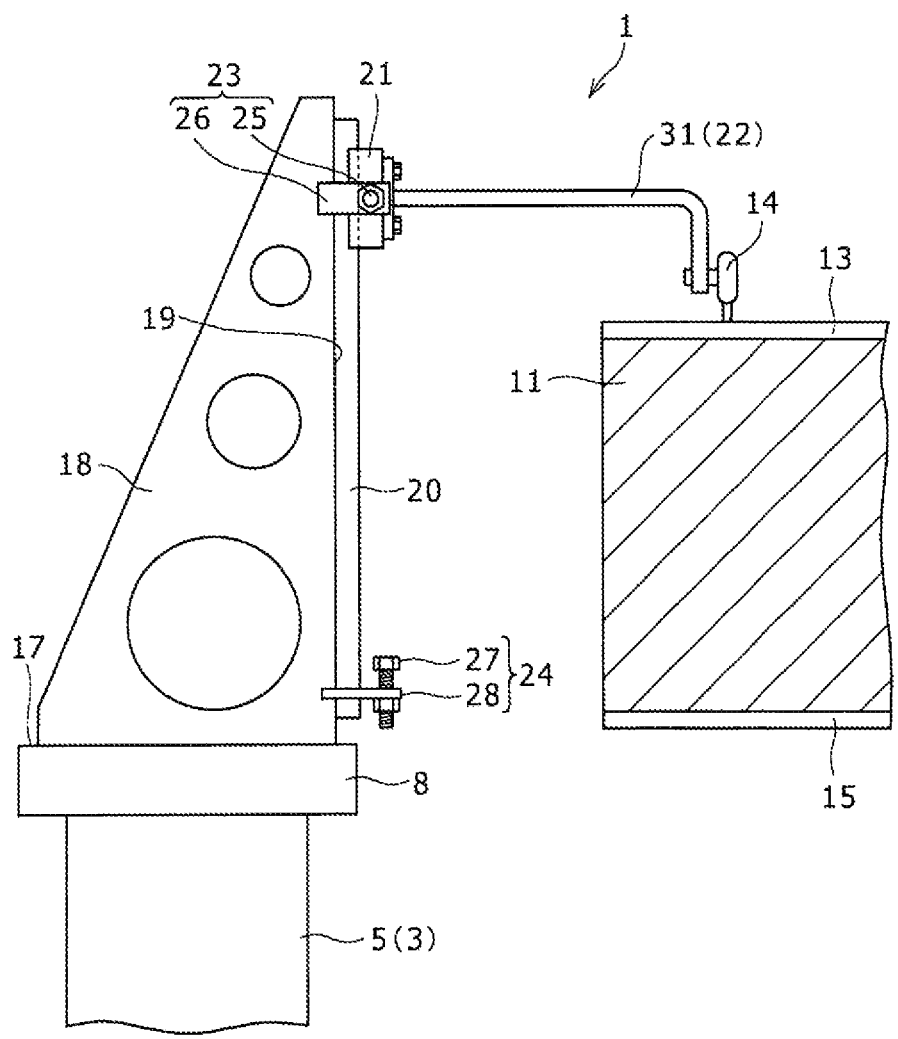
FIG. 5 is a view showing a way in which a squareness ascertaining arm member is mounted relative to an upper surface of the rotation drum.

The alignment ascertaining device according to the present embodiment is able to employ the squareness ascertaining arm member 31 in place of the parallelism ascertaining arm member 30. As shown in FIG. 5, the squareness ascertaining arm member 31 is a member that couples between the slider 21 and the neighborhood of the rotation drum 4, as is the case with the parallelism ascertaining arm member 30. The dial gauge 14 is disposed on the distal end portion of the squareness ascertaining arm member 31 so that the squareness extending probe is caused to make contact with the upper surface of the rotation drum 4. Note that the squareness ascertaining arm member 31 as exemplified in the drawing extends in the horizontal direction from its proximal end portion toward the rotation drum 4; its middle portion in the longitudinal direction is downwardly bent at substantially right angles; and the probe of the dial gauge 14, facing toward the upper surface of the rotation drum 4, is mounted on the perpendicularly bent distal end portion.

The dial gauge 14, which is mounted on the distal end portion of the arm member 22, includes the probe that makes contact with the surface of the rotation drum 4. The dial gauge 14 is the one that measures the amount of change in distance from the arm distal end portion to the surface of the rotation drum 4.

A method of ascertaining the placement of the rotation drum 4 using the above described alignment ascertaining device 1, in other words, a method of ascertaining the alignment of the rotation drum 4 according to the present embodiment, will be described next.

A procedure of ascertaining horizontally of the rotation drum 4 relative to the shaft axis of the spindle assembly 3 will be described first.

Figure 4A:
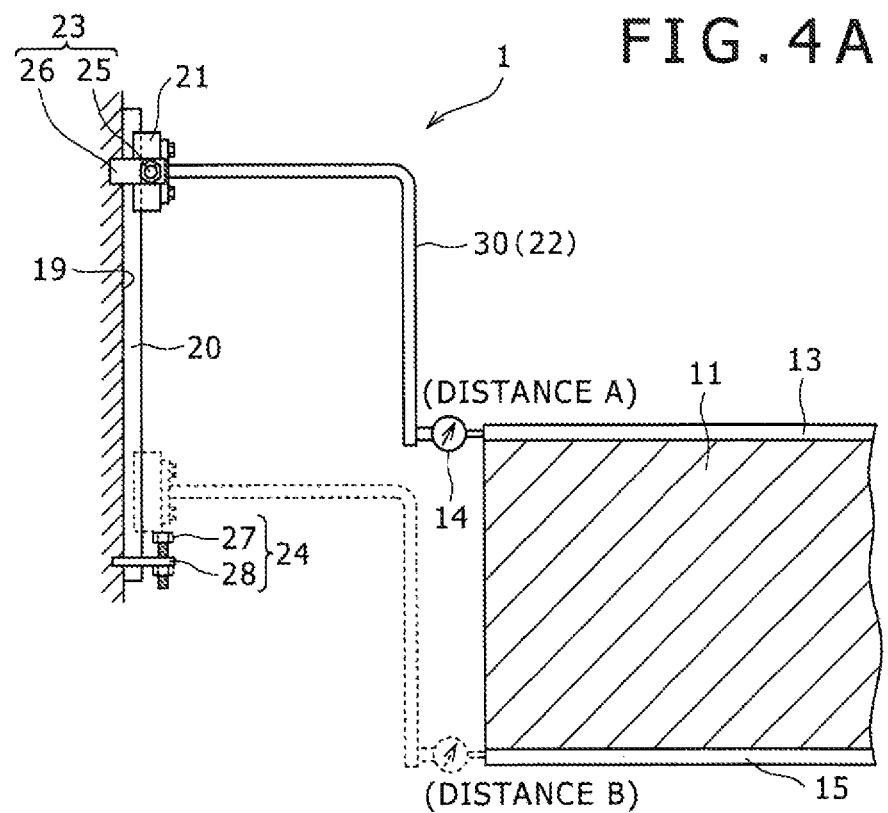
FIG. 4A is a side view showing movement of a parallelism ascertaining arm member relative to a side face of a rotation drum.
Figure 4B:
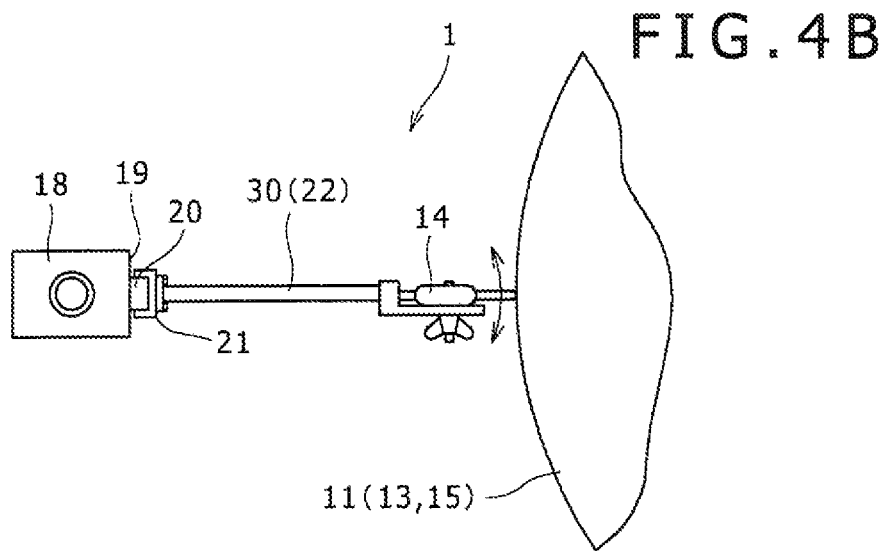
FIG. 4B is a plan view showing the movement of the parallelism ascertaining arm member.

As shown in FIGS. 4A and 4B, when the horizontally of the rotation drum 4 is ascertained relative to the shaft axis of the spindle assembly 3, the body portion 18 of the alignment ascertaining device 1 is placed on the upper surface of the flange portion 8 of the spindle assembly 3, and the body portion 18 is extendedly attached fixedly to the upper portion of the spindle assembly 3 with the bottom face of the body portion 18 being caused to make contact with the upper surface of the flange portion 8 (the mounting surface 17).

Next, the parallelism ascertaining arm member 30 is attached to the slider 21 attached to the linear guide portion 20 on the guide face 19 of the body portion 18. The parallelism ascertaining arm member 30 extends in the horizontal direction from its proximal end portion coupled to the slider 21 toward the rotation drum 4, and its middle portion in the longitudinal direction is downwardly bent at substantially right angles, and the dial gauge 14 is mounted on the lower end portion (distal end portion) bent. The dial gauge 14 is disposed with its probe oriented in the horizontal direction, and the tip of the probe is made to be able to make contact with the side face of the rotation drum 4.

Next, the slider 21 is caused to move to the top end of the liner guide portion 20 in a direction in which the linear guide portion 20 is installed, and the positioning bolt 25 for the above described upper level positioning device 23 is securely fastened to thereby determines the position of the slider 21 with respect to the upper end of the linear guide portion 20. Then, the probe of the dial gauge 14 is located at a level corresponding to the upper unsprayed surface 13 of the side of the rotation drum 4, so that the distance from the arm distal end portion to the surface of the rotation drum 4, in the other words, the distance from the shaft axis of the spindle assembly 3 to the upper unsprayed surface 13, is able to be measured using the dial gauge 14.

The tip of the dial gauge 14 is caused to scan onto the upper unsprayed surface 13 with the probe of the dial gauge 14 in contact with the upper unsprayed surface 13 and with the rotation drum 4 remaining stationary. More specifically, the spindle shaft 5 is rotated by any arbitrary angle to thereby swing the alignment ascertaining device 1 mounted on the flange portion 8 upper surface located above the top end of the spindle shaft 5, and then to cause the tip of the dial gauge to scan onto the upper unsprayed surface 13, as shown in FIG. 4B. A value resulting from the dial gauge tip being maximally drawn backwardly at this time is read as "value A."

Next, the positioning bolt 25 for the upper level positioning device 23 is unscrewed to make the slider 21 movable downwardly, and then the slider 21 is caused to move downwardly in a direction in which the linear guide portion 20 is installed. And when the slider 21 moves down to the lower end of the linear guide portion 20, the position of the slider 21 is determined with respect the lower end of the linear guide portion 20 using the positioning bolt 27 for the lower level positioning device 24. If doing so, the downward movement of the slider 21 is restricted to thereby allow the probe of the dial gauge 14 to make contact with the lower unsprayed surface 15 of the rotation drum 4.

And the tip of the dial gauge is caused to scan onto the lower unsprayed surface 15 with the probe of the dial gauge 14 in contact with the lower unsprayed surface 15 and with the rotation drum 4 remaining stationary. In other words, as is the case with "value A" which has been read, more specifically, the spindle shaft 5 is rotated by any arbitrary angle to thereby swing the alignment ascertaining device 1 mounted on the flange portion 8 upper surface located above the top end of the spindle shaft 5, and then to cause the tip of the dial gauge to scan onto the lower unsprayed surface 15, as shown in FIG. 4B. A value resulting from the dial gauge tip being maximally drawn backwardly at that time is read as "value B."

After the above described "value A" and "value B" have been read, the "value B" is subtracted from the "value A" and a performance index is derived by dividing the subtraction result by the distance L from the upper unsprayed surface 13 to the lower unsprayed surface 15 (height L of the rotation drum 4). By the use of the performance index—a value of (A−B)/L or an absolute value of (A−B)/L—the parallelism of the rotation drum 4 is assessed relative to the shaft axis of the spindle assembly 3.

More specifically, when the performance index exceeds a predetermined criteria (PARALLEL CRITERIA), it is determined that "the rotation drum 4 is not parallel" relative to the shaft axis of the spindle assembly 3. When the performance index is below a predetermined criteria (PARALLEL CRITERIA), it is determined that "the rotation drum 4 is parallel" relative to the shaft axis of the spindle assembly 3.

On the other hand, when the upper (lower) surface of the rotation drum 4 is ascertained to be at right angles relative to the shaft axis of the spindle assembly 3, the squareness ascertaining arm member 31 is attached to the slider 21, as is shown in FIG. 5. The dial gauge 14, mounted on the distal end portion of the squareness ascertaining arm member 31, is disposed with the probe oriented upwardly and downwardly (in the perpendicular direction), so that the tip of the probe is configured or designed to make contact with the upper surface of the rotation drum 4.

When the upper (lower) surface of the rotation drum 4 is ascertained to be at right angles using the dial gauge 14 of the above described squareness ascertaining arm member 31, the slider 21 is first caused to move to the upper portion of the liner guide portion 20 in a direction in which the linear guide portion 20 is installed, and then the probe of the dial gauge 14 is caused to make contact with the upper surface of the rotation drum 4. The position of the slider 21 is thereby determined with respect to the upper end of the linear guide portion 20 using the above described upper level positioning device 23. And with the probe of the dial gauge 14 being caused to make contact with the upper surface of the rotation drum 4, the position (distance in an upward and downward direction) of the upper surface of the rotation drum 4 is measured relative to the tip of the squareness ascertaining arm member 31.

More specifically, the squareness ascertaining arm member 31, which is horizontally extending from the slider 21 toward the rotation drum 4 and bent downwardly at a place above the rotation drum 4, is configured to include the dial gauge 14 at the distal end (lower end) of portion bent. Further, the body portion 18 to which the squareness ascertaining arm member 31 is attached is rotatable about the shaft axis of the spindle assembly 3, and is configured such that when the body portion 18 is caused to rotate about the shaft axis, the dial gauge 14 move so as to cross the upper surface of the rotation drum 4 in the form of a circular arc from one side to the other.

Figure 6:
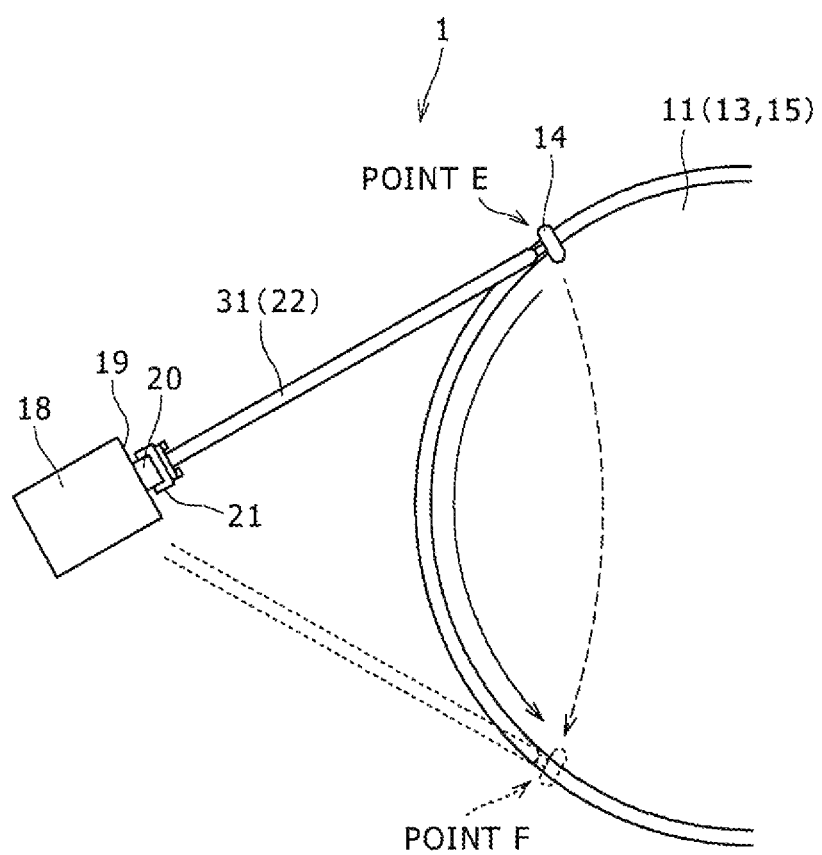
FIG. 6 is a view showing movement of the squareness ascertaining arm member relative to the upper surface of the rotation drum.

For instance, as shown in FIG. 6, the dial gauge 14 crossing the upper surface of the rotation drum 4 in a circular arc-shaped track path make measurements of values with the probe of the dial gauge 14 pressed against one place where the gauge intersects with the outer circumference of the drum body (point E in FIG. 6).

Next, the probe of the dial gauge 14 is pressed against the other place of the upper surface outer circumference (point F in FIG. 6). The value measured at this place is recorded as "value F" from the shaft axis of the spindle assembly 3 to the rotation drum 4. At this time, the measurement is made such that the rotation drum 4 is rotated to thereby cause the point E to coincide with the point F. Doing this way allows for cancellation of shear on a machined surface, produced on the upper surface portion of the rotation drum 4.

In this way, after the "value E" and "value F" have been read, the "value F" is subtracted from the "value E" and a performance index is derived by dividing the subtraction result by the horizontal distance L from one outer circumference to the other. By the use of the performance index—a value of (E−F)/L or an absolute value of (E−F)/L—the squareness of the rotation drum 4 is assessed relative to the shaft axis of the spindle assembly 3.

In other word, when the performance index exceeds a predetermined criteria (SQUARE CRITERIA), it is determined that "the rotation drum 4 is not at right angles" relative to the shaft axis of the spindle assembly 3. When the performance index is below a predetermined criteria (SQUARE CRITERIA), it is determined that "the rotation drum 4 is at right angles" relative to the shaft axis of the spindle assembly 3.

After the assessment result of "the rotation drum 4 is not parallel" or "the rotation drum 4 is not at right angles" is provided by performing the action as described above, the placement of the rotation drum 4 is corrected relative to the shaft axis of the spindle assembly 3 by a procedure such as in FIG. 7.

In situations where the rotation drum 4 is not parallel, the parallelism of the rotation drum 4 is aligned by unscrewing mounting bolts, not shown, of the load cells 16 to thereby move the load cells 16 to a position close to or away from the spindle assembly 3. After the alignment, the mounting bolts of the load cells 16 are fastened with normal fastening torque.

And in situations where the rotation drum 4 is not at right angles, plate-shaped shims 32 are inserted between a housing for supporting the rotation drum 4 and a guide mechanism for causing the housing to move in a horizontal direction, thereby allowing for correction of the squareness of the rotation drum 4. In other words, insertion of the shim 32 into four places (in front and behind, to the right and to the left) of the rotation drum 4 enables the axis of the rotation drum 4 to be parallel with the shaft axis of the spindle assembly 3.

Since the above described slider 21 is attached via the rolling member to the linear guide portion 20, there is very few jolt between the slider 21 and the linear guide portion 20. For this reason, even if the parallelism ascertaining arm member 22 and the squareness ascertaining arm member 31 are moved upwardly and downwardly, and rightwardly and leftwardly, the dial gauge 14 attached to the arm tip will not be jolted. Consequently, it is possible to ascertain precisely and exactly the placement of the rotation drum 4 relative to the shaft axis of the spindle assembly 3, more specifically, that the axis of the rotation drum 4 is parallel relative to the shaft axis of the spindle assembly 3, and that the upper or lower surface of the rotation drum 4 is at right angles relative to the shaft axis of the spindle assembly 3.

In addition, as describe above, if the parallelism ascertaining arm member 22 and the squareness ascertaining arm member 31 are interchangeably provided with respect to the slider 21, then members such as the slider 21 and the like are able to be used in common when horizontally of the rotation drum 4 is ascertained and when its squareness is ascertained. As a result, it is possible to simplify the configuration of the alignment ascertaining device 1.

Note that it should be appreciated that the embodiments disclosed herein are merely exemplary in all aspects and the invention is not limited to those embodiments. In particular, in the embodiments disclosed herein, in terms of data that are not explicitly disclosed, for example, such as operating and production conditions, various types of parameters, and sizes, weights and volumes of constituent elements, those values are employed which does not depart from the range of values to be used in ordinary cases by an ordinary person skilled in the art and which would be able to be readily assumed by the ordinary skilled person.

For example, a device is provided to the above described upper level positioning device 23, the device restricting the movement of the slider 21 by causing the positioning bolt 25 to make contact with the side face of the slider 2; however, another positioning device is able to be provided to the upper level positioning device 23.

Figure 8A:
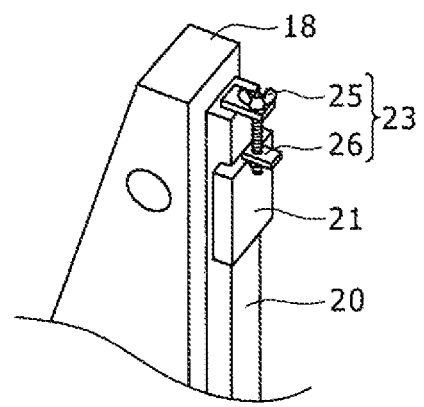
FIG. 8A is a perspective diagram showing an upper level positioning device according to a second embodiment.
Figure 8B:
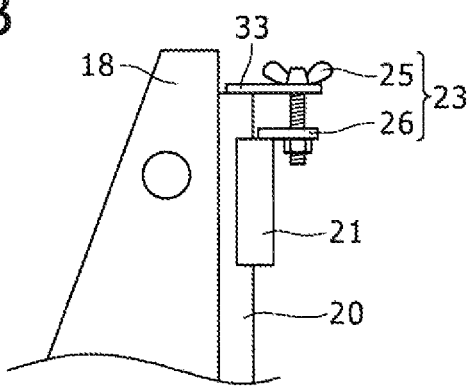
FIG. 8B is a front view of the upper level positioning device according to the second embodiment.

Stated differently, as shown in FIGS. 8A and 8B, there is provided on the slider 21 a bracket plate 33 that protrudes toward the rotation drum 4. Further, a mounting piece (bolt mounting plate 26) that protrudes from the guide face 19 toward the rotation drum 4 is first provided on the top end of the linear guide portion 20. And then, the positioning bolt 25 (exemplified as a wing nut in the drawing) is mounted protrudably and retractably on the mounting piece in an upward and downward direction, and bolt holes in which the positioning bolt 25 is threadedly mountable is formed in the bracket plate 33. With this arrangement, the tip of the positioning bolt 25 protruding downwardly from the mounting piece is threadedly mounted in the bolt hole of the bracket plate 33, and the position of the slider 21 is able to be determined with respect to the top end of the linear guide portion 20.

Figure 8C:
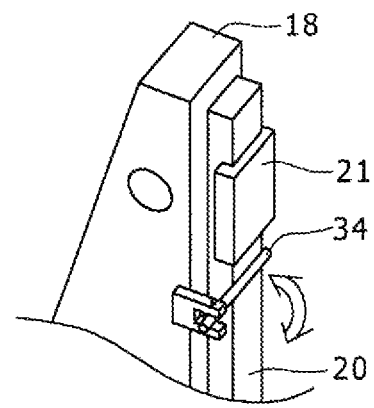
FIG. 8C is a perspective view showing an upper level positioning device according to a third embodiment.

Additionally, as shown in FIG. 8C, the plate-shaped mounting piece protruding from the guide face 19 toward the rotation drum 4 is first provided on the top end of the linear guide 20 and then, a rod-shaped swinging member 34 is swingably attached to the end portion of the mounting piece. The swinging member 34 is provided at the end portion of the mounting piece so that one end of the longitudinal member is able to swing relative to the other end, allowing the swung end of the swinging member 34 to be placed in the space below the slider 21. Even with this arrangement, the swinging member placed in the space below the slider 21 restricts downward movement of the slider 21, allowing the position of the slider 21 to be determined with respect to the top end of the linear guide portion 20.

In the above described embodiment, the distance is measured between the arm tip and the rotation drum using a dial gauge, and the invention is not limited to the dial gauge for measuring means. Any suitable distance meter and displacement meter may be selected that will provide necessary measurement accuracy.

What is claimed is:
1. A tire testing machine comprising:
a rotation drum;
a spindle assembly including a flange portion formed on a top end thereof; and
a rotation drum alignment ascertaining device that ascertains placement of the rotation drum relative to a shaft axis of the spindle assembly, the rotation drum alignment ascertaining device including:
a body portion mountable on a mounting surface formed horizontally on the spindle assembly, the mounting surface being a top surface of the flange portion of the spindle assembly, the body portion having a guide face in a direction orthogonal to the mounting surface, the spindle assembly being configured to rotatably support a tire about the shaft axis, the shaft axis being oriented in a direction perpendicular to the mounting surface and parallel with an axis rotatably supporting the rotation drum, the rotation drum being movable close to or away from the tire;
a linear guide portion mounted on the guide face of the body portion in a direction orthogonal to the mounting surface;
a slider mounted via a rolling member on the linear guide portion, the slider made movable by rolling the rolling member on a guide face of the linear guide portion in a direction in which the linear guide portion is installed;

an arm member whose proximal end portion is attached to the slider and whose distal end portion extends toward the rotation drum; and a distance measuring device mounted on the distal end portion of the arm member, the distance measuring device measuring a distance between the distal end portion of the arm member and the rotation drum, wherein the rotation drum alignment ascertaining device is configured to be removed from the tire testing machine before the tire is mounted on the tire testing machine for testing, and the rotation drum alignment ascertaining device is mounted to a single surface of the tire testing machine.

2. The tire testing machine of claim 1,
wherein the distance measuring device is a dial gauge.

3. The tire testing machine of claim 2,
wherein the arm member includes:

a parallelism ascertaining arm member that ascertains, by causing a probe of the dial gauge to make contact with the side face of the rotation drum, that the side face of the rotation drum is parallel with the shaft axis of the spindle assembly; and a squareness ascertaining arm member that ascertains, by causing the probe of the dial gauge to make contact with the top surface or the bottom surface of the rotation drum, that the top surface or the bottom surface of the rotation drum is at right angles relative to the shaft axis of the spindle assembly, the parallelism ascertaining arm member and the squareness ascertaining arm member being made interchangeable with respect to the slider.

4. The tire testing machine of claim 3,
wherein the side face of the rotation drum includes a thermally sprayed surface of the drum, formed at a location where the tire makes contact with the drum; an upper unsprayed surface formed adjacent to the upper portion of the thermally sprayed surface of the drum; and a lower unsprayed surface formed adjacent to the lower portion of the thermally sprayed surface of the drum; and the rotation drum alignment ascertaining device further comprising:

an upper level positioning device determines the position of the slider with respect to the linear guide portion so that a probe of the dial gauge disposed at a distal end portion of the parallelism ascertaining arm member makes contact with the upper unsprayed surface; and a lower level positioning device that determines the position of the slider with respect to the linear guide portion so that the probe of the dial gauge disposed at the distal end portion of the parallelism ascertaining arm member makes contact with the lower unsprayed surface.

5. The tire testing machine of claim 1,
wherein the arm member includes:

a parallelism ascertaining arm member that ascertains that, by measuring using the distance measuring device a distance between a side face of the rotation drum and a tip of the arm member, the side face of the rotation drum is parallel relative to the shaft axis of the spindle assembly; and a squareness ascertaining arm member that ascertains, by measuring using the distance measuring device a distance between a top surface or a bottom surface of the rotation drum and the tip of the arm member, that the top surface or the bottom surface of the rotation drum is at right angles relative to the shaft axis of the spindle assembly, the parallelism ascertaining arm member and the squareness ascertaining arm member being made interchangeable with respect to the slider.

6. The tire testing machine of claim 1,
wherein the rolling member is a ball.

7. The tire testing machine of claim 1,
wherein the rolling member is a roller.

8. The tire testing machine of claim 1,
wherein the slider is pressed towards the linear guide portion with a spring.

* * * * *